United States Patent [19]

Yoshimura et al.

[11] Patent Number: 4,853,425

[45] Date of Patent: Aug. 1, 1989

[54] MELT-PROCESSABLE FLUORINE-CONTAINING RESIN COMPOSITION

[75] Inventors: Tatsushiro Yoshimura; Nobuyuki Tomihashi, both of Takatsuki; Shuhei Shimasaki, Yono, all of Japan

[73] Assignee: Daikin Industries, Ltd., Osaka, Japan

[21] Appl. No.: 122,084

[22] Filed: Nov. 17, 1987

[30] Foreign Application Priority Data

Nov. 18, 1986 [JP] Japan ................................ 61-274904

[51] Int. Cl.$^4$ .......................... C08K 5/47; C08K 5/57; C08K 5/18
[52] U.S. Cl. ..................................... 524/83; 524/180; 524/181; 524/255
[58] Field of Search ................. 524/255, 180, 181, 83

[56] References Cited

U.S. PATENT DOCUMENTS 4,248,763  2/1981  Yoshimura et al. ............... 260/42.22
4,276,214  6/1981  Yoshimura et al. ............... 260/45.75

*Primary Examiner*—Veronica P. Hoke
*Attorney, Agent, or Firm*—Armstrong, Nikaido, Marmelstein, Kubovcik & Murray

[57] ABSTRACT

1. A melt-processable fluorine-containing resin composition comprising:
(A) a fluorovinyl ether-tetrafluoroethylene copolymer and
(B) a thermal stabilizer in an amount of not less than 0.01 to less than 500 ppm of said copolymer (A). When using the composition of the present invention, the bubbles formation is not caused upon sintering and the obtained product is not colored.

4 Claims, No Drawings

MELT-PROCESSABLE FLUORINE-CONTAINING RESIN COMPOSITION

BACKGROUND OF THE INVENTION

The present invention relates to a melt-processable fluorine-containing resin composition, and more particularly to a resin composition comprising not less than 0.01 to less then 500 ppm of a thermal stabilizer and a fluorovinyl ether-tetrafluoroethylene copolymer (hereinafter referred to as "PFA"), which has excellent thermal stability and can provide products which are not colored and have no bubble.

Melt-processable fluorine-containing resins including PFA have melt-flowability, that is, the melt viscosity of the resins is generally lower than $10^6$ poises at an optimum processing temperature and, therefore, they provide a film having less pinholes and voids as compared with polytetrafluoroethylene (hereinafter referred to as "PTFE") which is a typical and the most widely used fluorine-containing resin since it has an extremely high melt viscosity from $10^{10}$ to $10^{11}$ poises even at a processing temperature, i.e. about 380° C. and therefore, it has no melt-flowability. Accordingly, the melt-processable fluorine-containing resins are useful for use in coating or lining in the state of powder as well as a dispersion, and the obtained film is excellent in chemical resistance and corrosion resistance.

However, the thermal stability of the melt-processable fluorine-containing resins at high temperatures in the vicinity of their sintering temperatures is inferior to that of PTFE, and this often causes trouble in processing. That is, when the resins are heated at a suitable sintering temperature of 340° to 380° C. for a long time more than 30 minutes, the resins partially cause thermal decomposition, and particularly when the coated film is thick, bubbles are formed in the film inevitably. This phenomenon is accelerated by the influence of oxygen in air.

For this reason, there have hitherto been proposed (1) a process in which thickness of a coating per one application is made as small as possible (about 50 μm) and the coating procedures are repeated, (2) a process in which a resin having a low molecular weight is used and the coating is sintered at a considerably low temperature (320° to 340° C.), (3) a process in which a thermal stabilizer is admixed with a melt-processable fluorine-containing resin in a large amount (for instance, U.S. Pat. No. 4,276,214 and U.S. Pat. No. 4,248,763), and the like.

However, the above process (1) has the disadvantages that the application and sintering procedures must be repeated more than 20 times until a sintered film reaches a desired thickness (generally, not less than 1000 μm) and the processing conditions are narrow. Also, the process (2) results in the formation of bubbles when the thickness of the film per one application exceeds 100 μm, and therefore, it is low in productivity as in the process (1). Further, the obtained film is inferior in properties such as stress crack resistance and solvent crack resistance because of using a low molecular weight resin.

On the other hand, though the process (3) has the effects that the formation of bubbles is inhibited and the processing conditions become wide by blending a thermal stabilizer, for obtaining the above effects, it is required to admix the thermal stabilizer with a melt-processable fluorine-containing resin in an amount of not less than 0.05 part by weight based on 100 parts by weight of the resin (not less than 500 ppm). When, however, using the thermal stabilizer in such a large amount, the obtained product is colored by the remaining thermal stabilizer, thus resulting in the lowering of good value of the product.

An object of the present invention is to solve the above problems and to provide a melt-processable fluorine-containing resin composition having excellent thermal stability, that is, the formation of bubbles is not caused upon sintering and the processing conditions can be made wide, and capable of giving products which are not colored.

This and other objects of the present invention will become apparent from the description thereinafter.

SUMMARY OF THE INVENTION

It has now been found that PFA selected from among melt-processable fluorine-containing resins can sufficiently provide the formation of bubbles by admixing a thermal stabilizer even in a small amount, and furthermore, the obtained products are not colored.

In accordance with the invention, there is provided a melt-processable fluorine-containing resin composition comprising (A) a fluorivinyl ether-tetrafluoroethylene copolymer and (B) a thermal stabilizer in an amount of not less than 0.01 to less than 500 ppm of the copolymer (A).

DETAILED DESCRIPTION

PFA used in the present invention is a copolymer of tetrafluoroethylene and a fluorovinyl ether. It is preferable that a weight ratio of tetrafluoroethylene to fluorovinyl ether in PFA is from 98/2 to 90/10. The fluorovinyl ether used in the invention includes a fluorovinyl ether having the formula (1):

$$XCF_2(CF_2)_nOCF=CF_2 \quad (1)$$

wherein X is hydrogen or fluorine and n is 0 or an integer of 1 to 7, and a fluorovinyl polyether having the formula (2):

$$XCF_2(CF_2)_nO(\overset{\overset{\displaystyle CF_3}{|}}{C}FCF_2O)_{\overline{m}}CF=CF_2 \quad (2)$$

wherein X and n are the same defined as above and m is an integer of 1 to 7.

PFA may be modified with other copolymerizable monomers in a small amount and the modified PFA can also be used in the present invention. Examples of those copolymerizable monomers are, for instance, propylene, isobutylene, vinyl fluoride, vinylidene fluoride, trifluoroethylene, hexafluoropropylene, hexafluoroisobutene, and the like.

In the present invention, it is preferable to use the above-mentioned PFA having a particle size within the range of 20 mesh pass, especially 32 mesh pass.

As the thermal stabilizer used in the present invention, there can be employed, for instance, (a) at least one member selected from the group consisting of an amine antioxidant, an organosulfurous compound and an organotin antioxidant;

(b) at least one member selected from metal powders of tin and zinc;

(c) a mixture of a metal powder of Group VIII of the Periodic Table, an amine antioxidant and an organosulfurous compound;
(d) a mixture of an organosulfurous compound and a powder of tin or zinc;
(e) a mixture of one or more kinds of phenolic antioxidants and at least one member selected from the group consisting of an organosulfurous compound and an organotin antioxidant;
(f) a mixture of a carbon black powder, an organosulfurous compound and an amine antioxidant, or in addition at least one member selected from fine powders of zinc, tin, cobalt, nickel and iron;
(g) a mixture of one or more kinds of metallic soaps and at least one member selected from the group consisting of an amine antioxidant and an organosulfurous compound; and the like. Some of these thermal stabilizers are described in U.S. Pat. No. 4,276,214 and U.S. Pat. No. 4,248,763.

The amount of the thermal stabilizer is within the range of from not less than 0.01 ppm to less than 500 ppm of PFA, preferably from 0.05 to 400 ppm of PFA, more preferably from 0.5 to 200 ppm of PFA. When the amount of the thermal stabilizer is less than 0.01 ppm, the effect for improving thermal stability is poor. On the other hand, when the amount is not less than 500 ppm, the obtained products are colored.

Any known other additives may suitably be added to the fluorine-containing resin composition of the present invention as occasion demands, e.g. pigments such as carbon powder, titanium dioxide and cobalt oxide, reinforcing agents such as glass or carbon fiber powder and mica, leveling agents, antistatic agents, and the like.

In the present invention, PFA is blended with the thermal stabilizer and the additives in any of dry methods wherein they are blended in the form of powder and wet methods wherein they are blended in the form of slurry, and the blending method is suitably selected according to the desired form of the composition for use.

When it is desired to obtain the composition suited for use in powder coating, it is, of course, preferable to conduct the blending in the form of powder, and in which usual blenders and pulverizers such as sample mill, V-shaped blender, cone-shaped blender and Ribbon blender may be employed without particular limitation. It is necessary to conduct the blending of the thermal stabilizer with PFA at a temperature of less than about 200° C. so that the stabilizer is not influenced by heat, and for the same reason it is also necessary to take care so that the composition is not subject to the influence of heat at a temperature higher than about 200° C. prior to using it for coating.

When the blending is carried out by a wet process, the PFA having the above-mentioned particle size ranges is blended with the thermal stabilizer in an organic solvent such as toluene, xylene, perchloroethylene, chloroform, trichloroethylene or an alcohol, in water or in a mixture of the organic solvent and water. In case of using water as a medium, in order to uniformly disperse the thermal stabilizer is it preferred to add a surface active agent such as sodium alkylbenzenesulfonate, sodium alkylsulfate, polyethyleneglycol alkylphenyl ether, polyethyleneglycol alkyl ether or ammonium perchlorofluorocaprylate. The wet blending is conducted by employing any apparatuses for agitation or blending such as ball mill, vibrating ball mill, sand mill and roll mill without particular limitation.

The present invention is more specifically described and explained by means of the following Examples, in which all percentages and parts are by weight unless otherwise noted. It is to be understood that the present invention is not limited to the Examples, and various changes and modifications may be made in the invention without departing from the spirit and scope thereof.

EXAMPLES 1 TO 22 AND COMPARATIVE EXAMPLES 1 TO 5

A 50 liter kneader having four agitating blades (commercially available under the tradename "Speed Kneader" made by Showa Engineering Kabushiki Kaisha) was charged with 10 Kg of PFA powder (tetrafluoroethylene/perfluoropropyl vinyl ether=96.4/3.6 by weight) having an average particle size of 170 μm and a prescribed amount of a thermal stabilizer shown in Table 1, and the agitating blades were rotated for about 30 minutes at a speed of 1,500 r.p.m. to give a fluorine-containing resin composition in the form of powder.

A rectangular frame having a size of 10 cm×5 cm was placed on an iron plate, and the composition in the form of powder was placed in the frame in an amount calculated on the basis of the specific gravity of the obtained film after sintering so that the film had a thickness of 2000 μm. After removing the flame gently, the composition on the iron plate was sintered in an electric oven at a temperature shown in Table 1 for 1 hour to give a film.

The appearance of the obtained film was observed with the naked eye and the coloration of the film and the state of bubble formation in the film were examined.

The marks in the column of State of bubble formation in Table 1 have the following meanings, respectively.

: No bubbles being observed.
: Only several bubbles being observed.
×: Many bubbles being observed.

TABLE 1

| Ex. No. | Thermal stabilizer Kind | Thermal stabilizer Amount (ppm) | Sintering temperature (°C.) | State of a film after sintering Coloration | State of a film after sintering State of bubble formation |
| --- | --- | --- | --- | --- | --- |
| 1 | A*1 | 400 | 380 | No*5 | |
| 2 | A | 100 | 380 | No | |
| 3 | A | 50 | 380 | No | |
| 4 | A | 10 | 360 | No | |
| 5 | A | 5 | 320 | No | |
| 6 | A | 2 | 320 | No | |
| 7 | B*2 | 300 | 380 | No | |
| 8 | B | 100 | 380 | No | |
| 9 | B | 50 | 380 | No | |
| 10 | B | 10 | 360 | No | |
| 11 | B | 5 | 320 | No | |
| 12 | B | 2 | 320 | No | |
| 13 | C*3 | 50 | 340 | No | |
| 14 | C | 5 | 340 | No | |
| 15 | C | 2 | 340 | No | |
| 16 | C | 1 | 320 | No | |
| 17 | C | 0.5 | 320 | No | |
| 18 | D*4 | 5 | 340 | No | |
| 19 | D | 2 | 340 | No | |
| 20 | D | 1 | 320 | No | |
| 21 | D | 0.5 | 320 | No | |
| 22 | D | 0.05 | 320 | No | |
| Com. Ex. 1 | A | 600 | 380 | Yes*6 | |
| Com. Ex. 2 | B | 600 | 380 | Yes | |
| Com. Ex. 3 | C | 600 | 380 | Yes | |
| Com. Ex. 4 | D | 600 | 380 | Yes | |

TABLE 1-continued

| Ex. No. | Thermal stabilizer Kind | Thermal stabilizer Amount (ppm) | Sintering temperature (°C.) | State of a film after sintering Coloration | State of a film after sintering State of bubble formation |
| --- | --- | --- | --- | --- | --- |
| Com. Ex. 5 | — | — | 320 | No | X |

(Notes)
A*[1] 4,4'-Bis(α,α'-dimethylbenzyl)diphenylamine
B*[2] Zinc salt of 2-mercaptobenzothiazole
C*[3] Mixture of di-β-naphthyl-p-phenylenediamine and zinc salt of 2-mercapto-benzothiazole (1:1 by weight)
D*[4] Mixture of 4,4'-bis(α-α'dimethylbenzyl)diphenylamine, 2-mercaptobenzothiazole and cobalt powder (particle size: 1 to 2 μm)(3:3:2 by weight)
No*[5] The film was not colored.
Yes*[6] The film was colored.

When the melt-processable fluorine-containing resin composition of the present invention is used, the bubble formation is not caused on sintering, and the obtained product is not colored.

In addition to the ingredients used in the Examples, other ingredients can be used in the Examples as set forth in the specification to obtain substantially the same results.

What we claim is:

1. A melt-processable fluorine-containing resin composition comprising:
   (A) a fluorovinyl ether-tetrafluoroethylene copolymer and
   (B) a thermal stabilizer is at least one member selected from the group consisting of an amine antioxidant, an organosulfurous compound and an organotin antioxidant in an amount of not less than 0.05 to less than 400 ppm of said copolymer (A).

2. The composition of claim 1, wherein an amount of said thermal stabilizer (B) is from 0.5 to 200 ppm of said copolymer (A).

3. The composition of claim 1, wherein said copolymer (A) is a copolymer of tetrafluoroethylene and a fluorovinyl ether having the formula (1):

wherein X is fluorine or hydrogen and n is 0 or an integer of 1 to 7.

4. The composition of claim 1, wherein said copolymer (A) is a copolymer of tetrafluoroethylene and a fluorovinyl polyether having the formula (2):

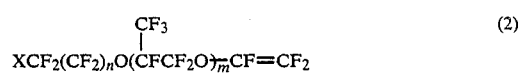

wherein X is fluorine or hydrogen, n is 0 or an integer of 1 to 7 and m is an integer of 1 to 7.

* * * * *